US012387121B2

(12) United States Patent
Resch et al.

(10) Patent No.: US 12,387,121 B2
(45) Date of Patent: Aug. 12, 2025

(54) COMBINING QUANTUM STATES OF QUBITS ON A QUANTUM PROCESSOR

(71) Applicant: Advanced Micro Devices, Inc., Santa Clara, CA (US)

(72) Inventors: Salonik Resch, Minneapolis, MN (US); Anthony Gutierrez, Seattle, WA (US); Mark H. Oskin, Bellevue, WA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 580 days.

(21) Appl. No.: 17/840,417

(22) Filed: Jun. 14, 2022

(65) Prior Publication Data

US 2023/0153672 A1 May 18, 2023

Related U.S. Application Data

(63) Continuation-in-part of application No. 17/491,304, filed on Sep. 30, 2021, now Pat. No. 12,169,758.

(51) Int. Cl.
*G06N 10/80* (2022.01)
*G06N 10/20* (2022.01)
*G06N 10/40* (2022.01)
*G06N 10/60* (2022.01)

(52) U.S. Cl.
CPC .................................... *G06N 10/20* (2022.01)

(58) Field of Classification Search
CPC ........ G06N 10/20; G06N 10/40; G06N 10/60; G06F 9/5061; G06F 9/4843
See application file for complete search history.

(56) References Cited

U.S. PATENT DOCUMENTS

| | | | | |
|---|---|---|---|---|
| 11,010,145 | B1 | 5/2021 | Smith et al. | |
| 11,121,725 | B2 | 9/2021 | Murali et al. | |
| 11,436,519 | B1 | 9/2022 | Dridi et al. | |
| 12,026,589 | B1 * | 7/2024 | Fowler | G06N 10/00 |
| 12,169,758 | B2 | 12/2024 | Resch et al. | |
| 2019/0213493 | A1 * | 7/2019 | Cortese | G06N 10/20 |
| 2022/0245498 | A1 * | 8/2022 | Pakhomchik | G06N 10/20 |
| 2022/0327413 | A1 * | 10/2022 | Zhang | G06N 10/80 |

FOREIGN PATENT DOCUMENTS

WO 2022228224 A1 11/2022

OTHER PUBLICATIONS

U.S. Appl. No. 17/491,304, filed Feb. 20, 2024 , "Non-Final Office Action", U.S. Appl. No. 17/491,304, filed Feb. 20, 2024, 9 pages.
U.S. Appl. No. 17/491,304, filed Aug. 12, 2024 , "Notice of Allowance", U.S. Appl. No. 17/491,304, filed Aug. 12, 2024, 9 pages.

* cited by examiner

*Primary Examiner* — Nghia M Doan
(74) *Attorney, Agent, or Firm* — FIG. 1 Patents

(57) ABSTRACT

An electronic device includes a quantum processor including a plurality of qubits. The quantum processor runs a plurality of instances of a quantum program using a separate set of qubits from among the qubits for each instance of the quantum program. The quantum processor then sets quantum states for ancilla qubits from among the qubits based on quantum states of respective groups of associated qubits from the separate sets of qubits. The quantum processor next provides an output of the instances of the quantum program based on the quantum states of the ancilla qubits.

20 Claims, 6 Drawing Sheets

COMBINING QUANTUM STATES OF QUBITS ON A QUANTUM PROCESSOR

RELATED APPLICATIONS

The instant application is a continuation-in-part of, and hereby claims priority to, pending U.S. patent application Ser. No. 17/491,304, which was filed on 30 Sep. 2021, and which is incorporated by reference herein in its entirety.

BACKGROUND

Related Art

Quantum computing is a technical field in which quantum processors with quantum elements such as qubits (e.g., Josephson junctions, etc.) are used for running quantum programs for performing computational operations. Current quantum processors include relatively small numbers of qubits, such as the 65 qubits found in International Business Machine's (IBM's) Quantum Hummingbird® as of February 2021. Quantum processors with thousands of qubits, however, are expected to be available in the year 2023 and beyond. Despite the expected advances in quantum processor design, quantum processors will remain in the so-called noisy intermediate-scale quantum (NISQ) era for years to come. In the NISQ era, quantum processors will be limited to relatively small numbers of qubits (i.e., up to a few thousand qubits) that are "noisy," in that the quantum programs running on the quantum processors can experience errors due to limited coherence time for the qubits, quantum gate errors, qubit measurement errors, etc. Due to the noisiness of qubits in the NISQ era, quantum programs will be limited to shallower "depths." That is, quantum programs will be limited in the number and/or type of operations that can be included in the quantum programs without an unacceptably high likelihood of encountering errors while running on a quantum processor due to noisy qubits. While some error correction is possible with larger numbers of qubits (e.g., hundreds of thousands of qubits), in the NISQ era, error correction is not feasible due to the relatively small number of qubits. Operating without error correction only adds to the limitations on the depth of the quantum programs that can be reliably executed on quantum processors.

In view of the errors that can occur due to noisy qubits, designers have proposed a number of different solutions for reliably running quantum programs on quantum processors. For one solution, designers have proposed using variational quantum algorithms (VQAs) as the quantum programs. VQAs are more viable than other forms of quantum programs due to a "hybrid" scheme used for executing VQAs. For the hybrid scheme, VQAs use quantum processors for running quantum programs with adjustable parameters and rely on ordinary, or "classical," processors (e.g., central processing units, graphics processing units, etc.) for setting and adjusting the parameters for runs of the quantum programs. In operation, the processor causes the quantum processor to run the VQAs numerous times (e.g., hundreds of times), with the processor setting/adjusting the parameters prior to some or all of the runs of the VQAs. The processor acquires outputs (i.e., results) generated during each of the runs of the VQA from the quantum processor and then generates an overall output for the VQA based on the outputs from the runs of the VQA. By collecting the outputs from numerous runs of the quantum program and generating an overall output therefrom, the hybrid scheme can help to overcome some of the effects of errors encountered due to noisy qubits. Even with the hybrid scheme, however, only relatively shallow quantum programs can be run on a quantum processor without experiencing unacceptably high error likelihood due to noisy qubits. Unfortunately, limiting the VQAs to shallow depth results in the VQAs only using a small number of the available qubits in a quantum processor, particularly in quantum processors with hundreds or thousands of qubits. In other words, despite using the hybrid scheme, running a single VQA on a quantum processor can significantly underutilize quantum processor hardware such as qubits. In addition, operations for acquiring the outputs generated during each run of the VQA from the quantum processor (i.e., measuring the quantum state of the qubits that were used for running the quantum program) are themselves prone to errors and take a relatively long time.

BRIEF DESCRIPTION OF THE FIGURES

Throughout the figures and the description, like reference numerals refer to the same figure elements.

DETAILED DESCRIPTION

Figure 1:
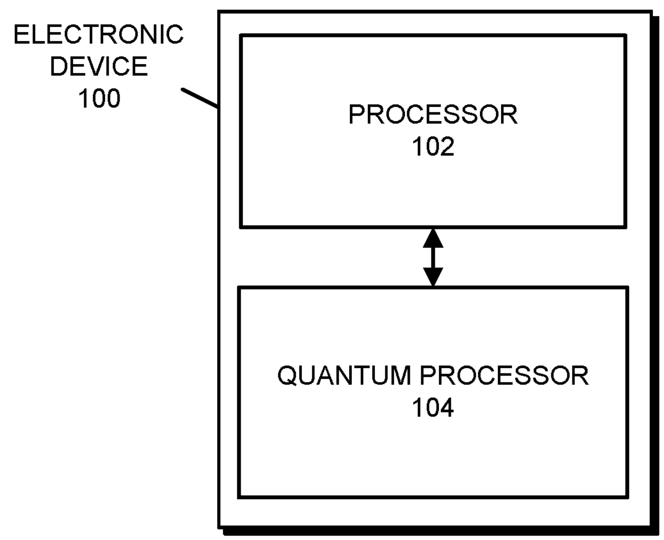
FIG. 1 presents a block diagram illustrating an electronic device in accordance with some implementations.

The following description is presented to enable any person skilled in the art to make and use the described implementations and is provided in the context of a particular application and its requirements. Various modifications to the described implementations will be readily apparent to those skilled in the art, and the general principles described herein may be applied to other implementations and applications. Thus, the described implementations are not limited to the implementations shown, but are to be accorded the widest scope consistent with the principles and features described herein.

Terminology

In the following description, various terms are used for describing implementations. The following is a simplified and general description of some of the terms. Note that these terms may have significant additional aspects that are not recited herein for clarity and brevity and thus the description is not intended to limit these terms.

Functional block: functional block refers to a set of interrelated circuitry such as integrated circuit circuitry, discrete circuitry, etc. The circuitry is "interrelated" in that circuit elements in the circuitry share at least one property. For example, the circuitry may be included in, fabricated on, or otherwise coupled to a particular integrated circuit chip, substrate, circuit board, or portion thereof, may be involved in the performance of specified operations (e.g., computational operations, control operations, memory operations, etc.), may be controlled by a common control element and/or a common clock, etc. The circuitry in a functional block can have any number of circuit elements, from a single circuit element (e.g., a single integrated circuit logic gate or discrete circuit element) to millions or billions of circuit elements (e.g., an integrated circuit memory). In some implementations, functional blocks perform operations "in hardware," using circuitry that performs the operations without executing program code.

Substantially in parallel: substantially in parallel, as used herein for describing running two or more instances of a quantum program on respective sets of qubits on a quantum processor, indicates that the instances of the quantum program are, to at least some extent, running concurrently, contemporaneously, simultaneously, etc. on the quantum processor. For example, two or more instances of the quantum program may be started at, or close to, a same time on respective sets of qubits and then run concurrently to completion on the respective sets of qubits. As another example, different instances of a quantum program can run independently on respective sets of qubits, with a new instance of the quantum program being started on each set of qubits when a prior instance has completed. Given that run times are not always identical for the sets of qubits, starting a new instance of the quantum program on each set of qubits may occur at different times—and thus instances may run concurrently on the respective sets of qubits, but start times and/or finish times for the different instances may not align.

Overview

In the described implementations, an electronic device includes a quantum processor with a set of qubits and quantum gates (e.g., phase shift gates, rotation gates, etc.) for performing quantum gate operations on the qubits. The quantum processor is used for executing quantum programs that include sequences of quantum gate operations on qubits. After the quantum gate operations of a quantum program have been performed on the qubits, measurement elements in the quantum processor measure the qubits and return an output of the quantum program based on the measurements. The electronic device also includes a processor, which can also be called a "classical" processor, such as a central processing unit (CPU) or graphics processing unit (GPU) that is used for executing software programs (e.g., applications, operating systems, etc.). The quantum processor and processor are used together in a "hybrid" scheme for executing quantum programs such as variational quantum algorithms (VQAs). For the hybrid scheme, the processor causes the quantum processor to run the quantum program a number of times to generate a set of outputs, i.e., outputs from each time that the quantum program is run. The processor acquires and processes the set of outputs to generate an overall output (i.e., result) for the quantum program.

In the described implementations, for the hybrid scheme, the processor runs two or more instances of a quantum program on the quantum processor substantially in parallel using separate sets of the qubits in the quantum processor. As described above, quantum programs typically use smaller numbers of qubits because the likelihood of encountering an error becomes unacceptably high with quantum programs that use larger numbers of qubits due to noisy qubits. Because the quantum processor can include large numbers of qubits (e.g., hundreds or thousands of qubits), if only a single instance of a quantum program was to be run on the quantum processor at a given time, qubits and other quantum processor resources may sit idle. In order to avoid this issue, the processor runs multiple instances of the quantum program substantially in parallel on the quantum processor using a separate set of the quantum processor's available qubits for running each instance of the quantum program. For example, the processor may start running each of two or more instances of the quantum program at around the same time using respective sets of qubits and allow each of the two or more instances of the quantum program to run to completion before starting another two or more instances of the quantum program on each of the sets of qubits—or on different sets of qubits.

In some implementations, for running the instances of the quantum program substantially in parallel on the quantum processor, the processor first selects a separate set of qubits from among the qubits in the quantum processor to be used to run each instance of the quantum program. The processor then runs each instance of the quantum program using the respective set of qubits. The processor next uses combined outputs from the instances of the quantum program for generating an overall output for the quantum program. That is, the quantum processor performs one or more statistical, mathematical, and/or logical operations using the combined outputs of the instances of the quantum program (and possibly other combined outputs of instances of the quantum program that are run separately on the quantum processor) for determining an overall output for the quantum program. Some implementations for selecting the separate sets of qubits and running the multiple instances of the quantum program using the separate sets of qubits are described in U.S. patent application Ser. No. 17/491,304, which was filed on 30 Sep. 2021. The process for running the instances of the quantum program can be considered running one "batch" of instances of the quantum program. In other words, a collection of instances of the quantum program run substantially in parallel on the quantum processor can be called a batch. The batch can be but one batch among two or more—and possibly a large number of—batches of the quantum program that are run on the quantum processor. In some implementations, outputs from the batch of instances of the quantum program are combined with outputs generated by other batches of instances of the quantum program to be used in determining the overall output of the quantum program (i.e., via the one or more statistical, mathematical, and/or logical operations).

In the described implementations, instead of measuring the quantum states of individual qubits that were used by the quantum processor for running two or more instances of the quantum program, the quantum processor combines the quantum states of groups of associated qubits and then measures the combined quantum state. In other words, in these implementations, the quantum processor aggregates the quantum states of specified qubits that were used by the quantum processor for running two or more instances of the quantum program before measuring the quantum states and providing the result of the measurement to the processor as the output for the instances of the quantum program. For this operation, the quantum processor uses ancilla qubits for storing the aggregated quantum states. That is, the quantum processor sets the quantum states of ancilla qubits based on the quantum state of groups of associated qubits for the instances of the quantum program. The quantum processor then measures the quantum state of the ancilla qubits instead of measuring the quantum state of each of the qubits for the instances of the quantum program. By measuring the quantum state of the ancilla qubits instead of the qubits themselves, the quantum processor can significantly reduce the number of measurements needed for providing the outputs of the instances of the quantum program.

In some implementations, for setting the quantum state of an ancilla qubit based on the quantum states of the qubits in a given group of associated qubits, the quantum processor performs at least one quantum gate operation to update a quantum state of the ancilla qubit based on the quantum state of each of the qubits in the given group of associated qubits. In some of these implementations, the quantum gate operation includes operations of one or more controlled quantum gates that are controlled based at least in part on the quantum state of the qubits in the given group of associated qubits. For example, the controlled quantum gate can be or include a CNOT quantum gate, a controlled rotation quantum gate, etc. In these implementations, the effect on the ancilla qubit is that a final quantum state of the ancilla qubit (after each of the quantum gate operations have been performed) is set based on—and thus represents or otherwise identifies—a combination of the quantum states of each of the qubits in the given group of associated qubits. In some implementations, the quantum processor sets the ancilla qubit to a known quantum state prior to performing the at least one quantum gate operation on the ancilla qubit.

In some implementations, the quantum processor controls or "weights" an amount by which each qubit in a given group of associated qubits effects the quantum state of an ancilla qubit when the quantum states of the qubits in the given group of associated qubits are used for setting the quantum state of the ancilla qubit. In these implementations, the qubits in the given group of associated qubits can have different properties, such as different a quantum gate fidelity, measurement error rates, etc.—and thus have different levels of quality (i.e., be more or less likely to properly retain quantum states, once set in the quantum states). The quantum processor may permit higher quality qubits to have larger effects on ancilla qubits than lower quality qubits. In these implementations, the quantum processor, processor, and/or another entity keeps quality metrics for qubits or groups thereof. The quantum processor then uses the quality metrics for controlling how the quantum state of each qubit is used for setting the quantum state of a given ancilla qubit.

By using qubits in a quantum processor for running multiple instances of a quantum program on the quantum processor substantially in parallel, the described implementations avoid leaving the qubits and other elements in the quantum processor idle. In addition, the described implementations more rapidly run instances of the quantum program (in contrast to existing systems in which the instances of the quantum program are run one at a time in a serial sequence on the quantum processor). By combining the quantum state of groups of associated qubits into the ancilla qubits and measuring the quantum state of the ancilla qubits, the described implementations can reduce the number of qubit measurements to be performed for acquiring the output of multiple instances of the quantum program. By using weighing to control the effect on ancilla qubits of particular qubits in groups of associated qubits, the described implementations can limit the use of the quantum state of lower quality qubits for setting the quantum state of ancilla qubits, which can help to ensure that the quantum states of the ancilla qubits are set to an accurate combined quantum state of the qubits. In this way, operation of the quantum processor is sped up and improved, which improves the performance of the electronic device. Improving the performance of the electronic device improves user satisfaction with the electronic device.

Electronic Device

FIG. 1 presents a block diagram illustrating electronic device 100 in accordance with some implementations. As can be seen in FIG. 1, electronic device 100 includes processor 102 and quantum processor 104. Processor 102 and quantum processor 104 are implemented in "hardware," i.e., using corresponding integrated circuitry, discrete circuitry, and/or devices. For example, in some implementations, processor 102 and quantum processor 104 are implemented in integrated circuitry on one or more semiconductor chips, are implemented in a combination of integrated circuitry on one or more semiconductor chips in combination with discrete circuitry and/or devices, or are implemented in discrete circuitry and/or devices.

Processor 102 is a functional block that performs computational and other operations. For example, in some implementations, processor 102 is or includes one or more central processing units (CPU), graphics processing units (GPU), embedded processors, application specific integrated circuits (ASICs), microcontrollers, and/or other functional blocks.

Figure 2:
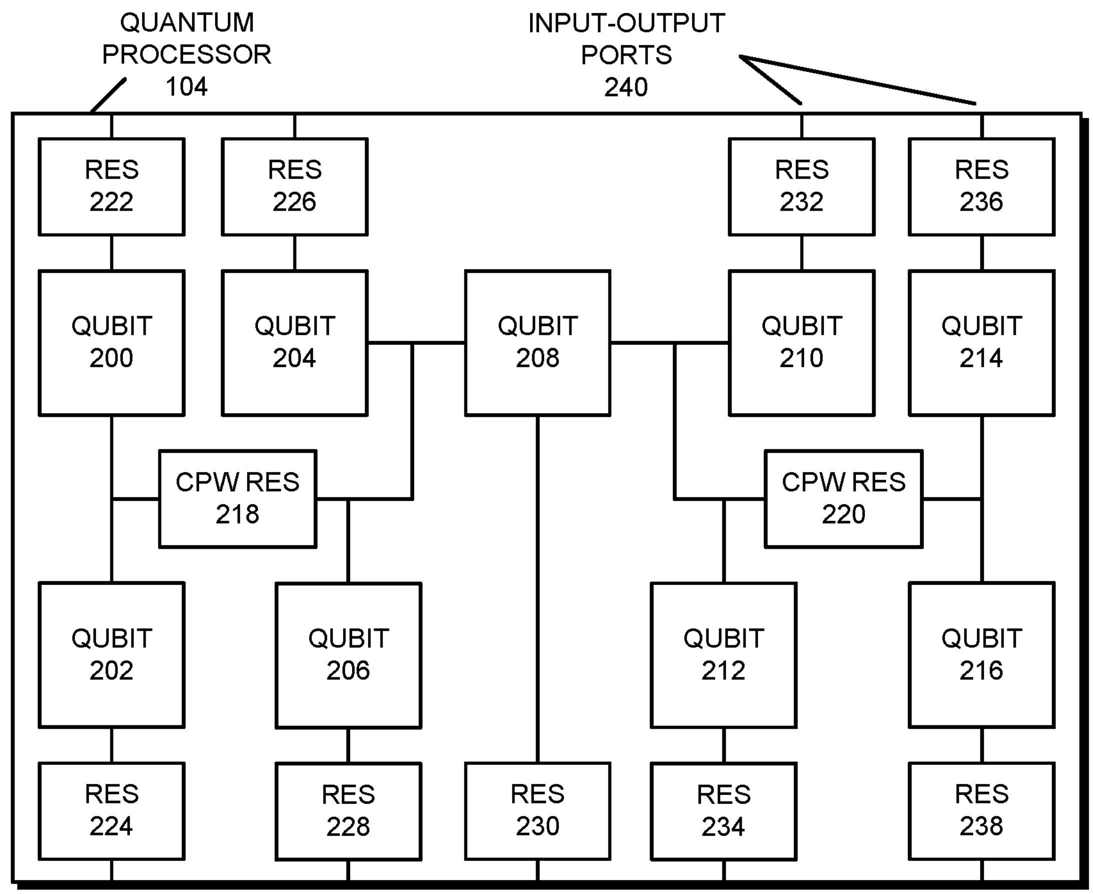
FIG. 2 presents a block diagram illustrating a quantum processor in accordance with some implementations.

Quantum processor 104 is a functional block that performs computational and other operations. Quantum processor 104 uses properties of or associated with quantum states for quantum elements, e.g., superposition, entanglement, etc., to perform computations. In some implementations, quantum processor 104 includes quantum bits, or qubits, that are used for performing computations. FIG. 2 presents a block diagram illustrating a quantum processor 104 in accordance with some implementations. Quantum processor 104 is a superconducting quantum processor that includes nine transmon qubits 200-216 (e.g., implemented using Josephson junctions). Quantum processor 104 also includes two superconducting coplanar waveguide resonators (CPW RES) 218-220 that serve as quantum busses. Quantum processor 104 further includes readout resonators (RES) 222-238 for controlling and measuring/reading out respective qubits 200-216 via corresponding input-output ports (only two of which are labeled in FIG. 2 as input-output ports 240 for clarity).

In the described implementations, processor 102 and quantum processor 104 are used in combination in a "hybrid" scheme for running quantum programs on quantum processor 104. For the hybrid scheme, processor 102 initiates runs of a quantum program on quantum processor 104 by causing the quantum program to be run on quantum processor 104—and possibly setting parameters for the quantum program prior to some or all of the runs of the quantum program. Processor 102 also acquires outputs generated while running the quantum program on quantum processor 104 and determines an overall output for the quantum program based on the outputs of the individual runs of the quantum program.

In the described implementations, for the above-described hybrid scheme, processor 102 runs two or more instances of a quantum program substantially in parallel on quantum processor 104. For running the two or more instances of the quantum program, processor 102 selects a separate set qubits for each instance of the quantum program from among available qubits in quantum processor 104 (i.e., qubits 200-216). Processor 102 then runs each of the two or more instances of the quantum program substantially in parallel on respective separate sets of qubits. After the two or more instances of the quantum program have run, quantum processor 104 combines the quantum state of groups of associated qubits in the separate sets of qubits. For this operation, quantum processor 104 sets the quantum state of respective ancilla qubits based on the quantum states of qubits in each group of associated qubits, thereby combining the quantum states of the qubits in each group of associated qubits into a respective ancilla qubit. Processor 102 acquires the outputs from the instances of the quantum program from the ancilla qubits to be used for generating the overall output (i.e., result) of the quantum program. Operations for running instances of a quantum program substantially in parallel on a quantum processor and combining quantum states of groups of associated qubits into ancilla qubits are described in more detail below.

Although quantum processor 104 is shown with a particular arrangement of qubits and other elements, in some implementations, quantum processor 104 includes a different arrangement of qubits. For example, in some implementations, quantum processor 104 includes a 30×30 grid of qubits and/or other elements (e.g., resonators, input-output elements, and/or other elements). As other examples, in some implementations, quantum processor 104 includes arrangements of qubits and other elements similar to those in Google's Sycamore® quantum processor, International Business Machines' Hummingbird® quantum processor, etc. Generally, in the described implementations, quantum processor 104 includes sufficient qubits and/or other elements to execute instances of a quantum program substantially in parallel and store the combined quantum state of groups of associated qubits in ancilla qubits as described herein.

Although electronic device 100 is shown in FIG. 1 as including only processor 102 and quantum processor 104, electronic device 100 is simplified for descriptive purposes. In some implementations, electronic device 100 includes other functional blocks and devices. For example, in some implementations, electronic device 100 includes one or more memory subsystems (e.g., a "main memory," etc.), human interface subsystems, networking subsystems, and/or electrical power subsystems. Generally, in the described implementations, electronic device 100 includes sufficient numbers and/or arrangements of functional blocks to perform the operations herein described.

Electronic device 100 can be, or can be included in, any electronic device that performs computational operations. For example, electronic device 100 can be, or can be included in, quantum computers, desktop computers, servers, artificial intelligence apparatuses, virtual or augmented reality equipment, network appliances, etc., and/or combinations thereof.

Quantum Programs

Figure 3:
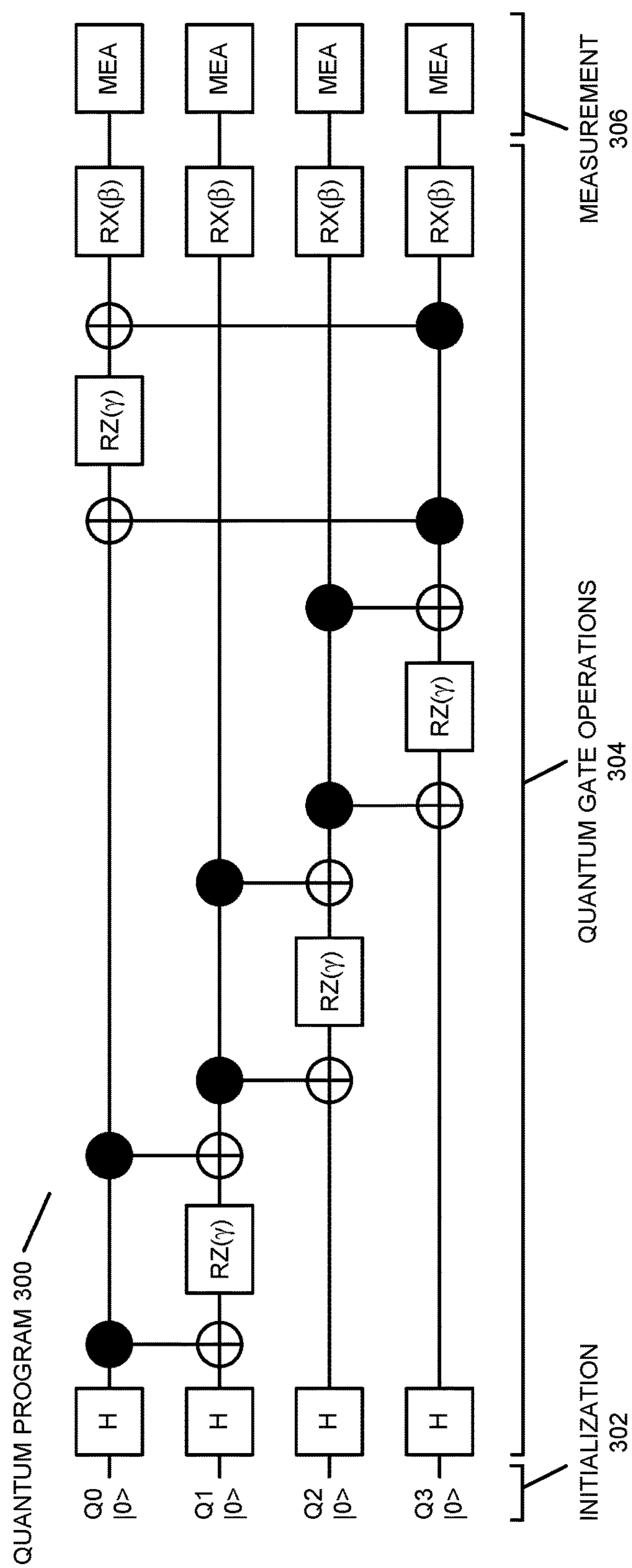
FIG. 3 presents a block diagram illustrating a quantum program in accordance with some implementations.

In the described implementations, a quantum program is run (i.e., executed, performed, etc.) on a quantum processor. Generally, a quantum program, which can also be called a "quantum circuit," is or includes a series of operations to be performed by a quantum processor on qubits (or other quantum entities and/or quantum data). FIG. 3 presents a block diagram illustrating a quantum program 300 in accordance with some implementations. In some implementations, a quantum program similar to the quantum program 300 is used for a quantum approximation optimization algorithm (QAOA), which is an algorithm for solving combinatorial optimization problems (e.g., for finding an optimal object in a set of objects).

Quantum program 300 can be considered to have three parts, with a first part being initialization 302 for a set of qubits, a second part being quantum gate operations 304 on the qubits, and a third part being measurement 306 of the quantum state of the qubits. For initialization 302, qubits Q0-Q4 ("the qubits") are placed in a desired quantum state, as shown via the well known |0> notation in FIG. 3. For quantum gate operations 304, a number of quantum gate operations are performed on/applied to individual qubits or pairs of the qubits. Using qubit Q0 as an example, a Hadamard quantum gate (H) is applied to qubit Q0 to map the qubit basis state |0> to two superposition states with equal weight of the basis states |0> and |1> (i.e., to create an evenly distributed quantum state for qubit Q0 ). A first controlled NOT (CNOT) quantum gate is applied to the Q0 and Q1 qubits, which flips the state of the Q1 qubit (i.e., the target qubit) when the Q0 qubit's (i.e., the control qubit's) state is |1>. A second CNOT quantum gate is applied to the Q0 and Q1 qubits. A third CNOT gate is applied to the Q0 and Q3 qubits, which flips the state of the Q0 qubit when the Q3 qubit's state is |1>. A Z-rotation quantum gate is applied to the Q0 qubit, which rotates the phase state of the qubit by γ about the Z-axis. A fourth CNOT gate is applied to the Q0 and Q3 qubits. An X-rotation quantum gate is applied to the Q0 qubit, which rotates the phase state of the qubit by β about the X-axis. For measurement 306, measurement elements (MEA) in the quantum processor measure the states of qubits Q0-Q3. The measurement elements return one or more values, such as bit values representative of the state of the respective qubits. For example, in some implementations, the measurement elements return a bit string or vector that separately represents the quantum state of each individual qubit.

Although a quantum program that uses four qubits is described as an example in FIG. 3, the described implementations are operable with a quantum program that uses a different number of qubits. In addition, although a number of quantum gate operations (e.g., Hadamard, CNOT, etc.) are used as an example in the quantum program, in some implementations additional or different quantum gate operations and/or different numbers of quantum gate operations are included in the quantum program. Generally, the described implementations are useable with quantum programs with various numbers of operations that use various numbers of qubits. Also, although the qubits are shown as being individually measured in FIG. 3, in some implementations, the quantum states of groups of associated qubits used for running two or more instances of the quantum program are combined before being measured. The combination of quantum states for groups of associated qubits is described in more detail below.

Hybrid Scheme

In the described implementations, a processor and a quantum processor (e.g., processor 102 and quantum processor 104) are used in combination in a hybrid scheme. Generally, for the hybrid scheme, the processor configures and runs a quantum program (e.g., quantum program 300) on the quantum processor and then generates an overall output for the quantum program based on outputs from running the quantum program returned by the quantum processor. For example, in some implementations, the quantum program is a variational quantum algorithm (VQA), which is a parameterized quantum program. In these implementations, the processor runs a VQA a number of times (e.g., hundreds of times) on a quantum processor and acquires a set of outputs that includes individual outputs from each of the runs of the VQA—or combinations of outputs for groups of associated qubits for two or more runs of the VQA. The processor may also dynamically adjust the parameters for the VQA for subsequent runs of a VQA as some or all of the runs complete (e.g., based on a specified trend in output values, etc.). The processor then combines the outputs in the set of outputs to generate the overall output for the VQA. For example, the processor can compute an average, gradient descent, and/or other statistical value or values (e.g., a distribution, etc.) based on the outputs in the set of outputs.

Figure 4:
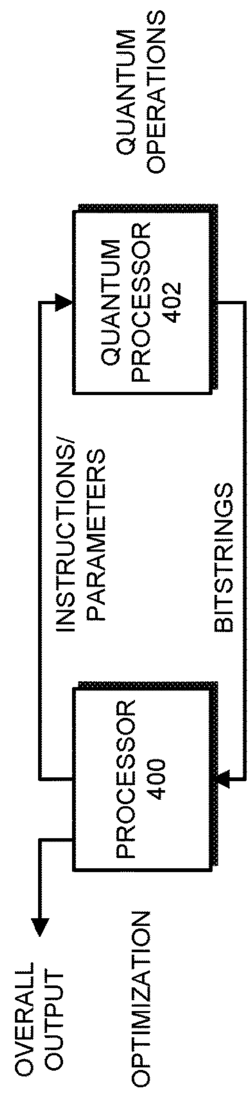
FIG. 4 presents a block diagram illustrating a hybrid scheme in accordance with some implementations.

FIG. 4 presents a block diagram illustrating a hybrid scheme in accordance with some implementations. As can be seen in FIG. 4, for the hybrid scheme, processor 400 configures a quantum program (e.g., a VQA such as quantum program 300) for running on quantum processor 402 and communicates a request to run the quantum program along with information about the configuration to quantum processor 402, which is shown as "INSTRUCTIONS/PARAMETERS." For example, processor 400 may determine values such as β and γ as shown in quantum program 300 for the run of the quantum program and communicate the values of β and γ to the quantum processor. Upon receiving the request, quantum processor 402 runs the quantum program using the configuration, which is shown as "QUANTUM OPERATIONS." Running the quantum program causes quantum processor 402 to generate outputs, which are returned to processor 400, which is shown as "BITSTRINGS." Processor 400 can then configure the quantum program for a next run on the quantum processor, assuming that there is a next run, which is shown as "OPTIMIZATION." While running the quantum program on quantum processor 402 a specified number of times (as shown via the loop in FIG. 4), processor 400 collects a set of outputs from all of the runs of the quantum program. Note that the specified number of times may be a fixed/preset number of times, or the runs of the quantum program may continue until a completion condition is reached, such as a size in a change of the outputs between two or more iterations has been reached, etc. Processor 400 then generates an overall output (i.e., result) for the quantum program, which is shown as "OVERALL OUTPUT." based on the collected outputs—or at least some of the collected outputs, as deviant and/or erroneous outputs may be filtered/discarded, etc.

Qubits in a Quantum Processor

In the described implementations, a quantum processor (e.g., quantum processor 104) includes a set of M qubits (or other quantum elements) that can be used for running quantum programs and for other operations (where M=65, 500, 4000, or another number). In some implementations, a quantum program to be run on the quantum processor requires N qubits to run, which can be fewer—and possibly far fewer—than all of the qubits available on the quantum processor. In these implementations, if a single instance of the quantum program was to be run on the quantum processor alone, a number of the qubits would be left idle. Assuming that the difference between M and N is sufficiently large, multiple instances of the quantum program can be run substantially in parallel using the available qubits of the quantum processor. For example, if M=200 and N=45 (and other conditions are met), up to four instances of the quantum program to run substantially in parallel on the quantum processor.

Figure 5:
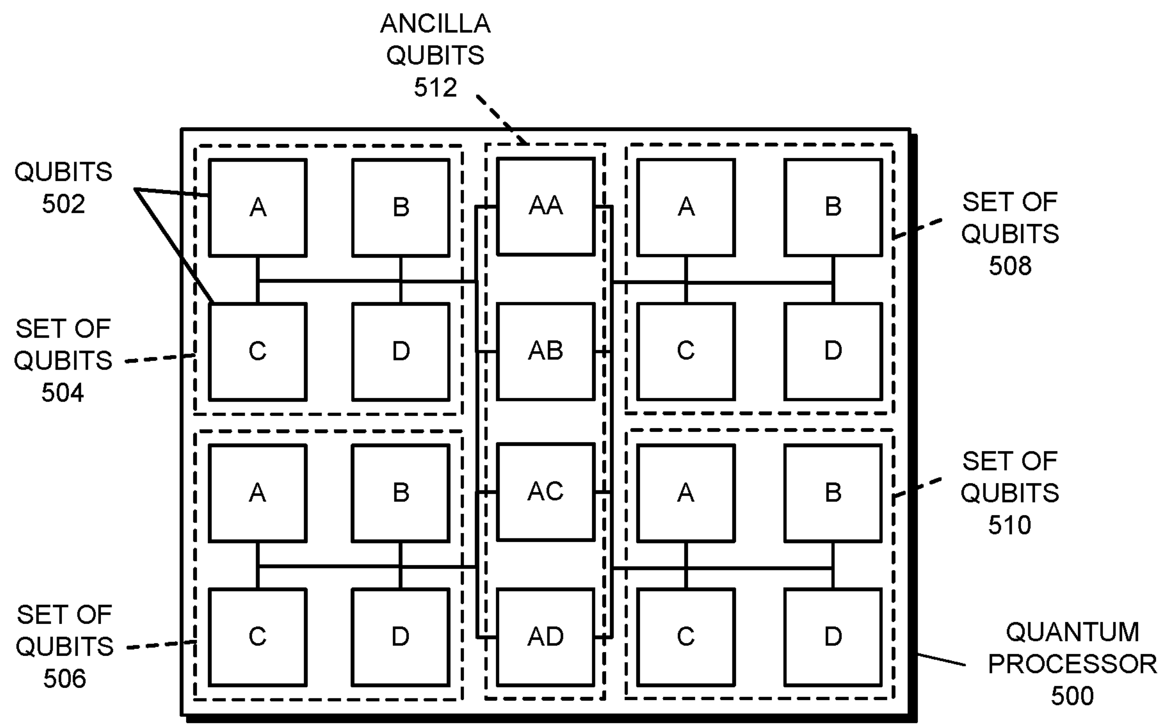
FIG. 5 presents a block diagram illustrating sets of qubits in a quantum processor in accordance with some implementations.

FIG. 5 presents a block diagram illustrating a set of qubits in a quantum processor in accordance with some implementations. As can be seen in FIG. 5, quantum processor 500 includes twenty qubits 502 (only two of the qubits are labeled for clarity). Assuming a quantum program that uses four qubits (e.g., quantum program 300) is to be run on quantum processor 500, each instance of the quantum program uses four qubits. When other conditions are met, e.g., the qubits support the quantum gate operations of the quantum program, etc., up to five instances of the quantum program can therefore be executed substantially in parallel on quantum processor 500. For example, in some cases, an instance of the quantum program can be run on each of the four sets of qubits 504-510. As described in more detail below, the remaining qubits, i.e., ancilla qubits 512, can be used for combining the quantum state of groups of associated qubits upon which instances of the quantum program were run.

In some implementations, a processor (e.g., processor 102) selects sets of qubits on which the instances of the quantum program are to be run. For example, the processor can select qubits to be included in each separate set of qubits based on operations of the quantum program and an arrangement of qubits in the quantum processor. In other words, based on the particular operations of the quantum program (e.g., quantum gates to be applied/used, relationships between qubits or groups thereof, etc.) and the operations that can be performed with/using some or all of the qubits in the quantum processor, the processor selects a respective set of qubits to be used for running each instance of the quantum program. For instance, if a particular connectivity or relationship between two or more qubits is required in order to run the quantum program and the quantum program has only X sets of two or more qubits that have the particular connectivity or relationship, the processor can select X sets of qubits (X=2, 6, or another number). Continuing the example in FIG. 5, assuming that the qubits in each set of qubits 504-510 are able to perform the operations of the quantum program, the processor can select the four sets of qubits 504-510 for running four instances of the quantum program substantially in parallel.

In some implementations, when selecting qubits to be included in sets of qubits as described above, the processor uses quality metrics associated with individual qubits and/or groups thereof to determine qubits to be included in sets of qubits. In these implementations, the processor, quantum processor, and/or another entity keeps quality metrics representative of the quality of outputs produced using the qubits and/or groups thereof. The quality metrics associated with the qubits and/or groups thereof can be representative of quantum gate fidelity for individual qubits or groups thereof; a measurement error rate for individual qubits or groups thereof; and a number and type of connections between qubits for individual qubits or groups thereof. In these implementations, the quality metrics can be scores associated with each qubit and/or group thereof and the processor can use aggregate scores for different combinations of qubits for selecting sets of qubits (assuming that the combinations of qubits are otherwise valid for running the quantum program). In some implementations, individual qubits and/or groups thereof with particularly low quality metrics or aggregate quality metrics may be excluded from being used for running instances of the quantum program—and thus may not be selected as, or as part of, sets of qubits. In some implementations, the processor attempts to balance the quality metrics between sets of qubits so that the selected sets of qubits are of approximately equal quality (i.e., to the extent possible, have similar aggregate quality scores).

In some implementations, instances of quantum program can be run substantially in parallel in two or more batches, with each batch having its own set of instances of the quantum program run substantially in parallel on qubits in the quantum processor. For example, for the above-described variational quantum algorithms, hundreds of instances of the VQA can be run, with only a relatively small number of instances of the VQA being run substantially in parallel on the quantum processor in a batch at any given time. In these implementations, the above-described selection of the sets of qubits for running instances of the quantum program can be dynamic. That is, the processor can newly select sets of qubits for instances of the quantum program between each batch of multiple batches, after a given number of batches of multiple batches has been run, etc. In these implementations, the quality metrics associated with individual qubits and/or groups of qubits among qubits in a quantum processor that are used for selecting the sets of qubits can be quality metrics acquired from and/or during one or more prior batches. The processor can therefore monitor the runs of instances of the quantum program in batches and update/change the qubits in the sets of qubits used for running instances of the quantum program between batches.

Although twenty qubits 502 are shown in quantum processor 500 as an example, in some implementations, quantum processor 500 includes a different number of qubits. For example, in some implementations, quantum processor 500 includes 50, 500, 2000, or another number of qubits. In addition, although a particular arrangement and connectivity of qubits is shown in FIG. 5, in some implementations, quantum processor 500 includes a different arrangement and/or connectivity of qubits. Also, although no other circuitry/elements (e.g., intermediate circuitry, qubit measurement circuitry, etc.) are shown in FIG. 5, in some implementations, at least some other circuitry/elements are included in quantum processor 500 (some examples of other circuitry/elements are shown in FIG. 2). Generally, the operations described herein can be performed using any number and arrangement of qubits in a quantum processor.

Combining Quantum States of Groups of Associated Qubits

In the described implementations, after running multiple instances of a quantum program in parallel using sets of qubits in a quantum processor, the quantum processor combines the quantum states of groups of associated qubits upon which the instances of the quantum program were run. For example, after running each of four instances of the quantum program using sets of qubits 504-510, respectively, the quantum processor can combine the quantum states of groups of associated qubits from sets of qubits 504-510. Generally, each group of associated qubits includes a qubit in each set of qubits upon which the quantum program performed the same sequence quantum gate operations—which can, in some cases, be regarded as a "same" qubit for each instance of the quantum program. Some examples of groups of associated qubits are shown via the labels A-D in FIG. 5, with a first group of associated qubits including the A qubits in sets of qubits 504-510, a second group of associated qubits including the B qubits, a third group of associated qubits including the C qubits, and a fourth group of associated qubits including D qubits.

The quantum processor "combines" the quantum states of groups of associated qubits as described above by aggregating the quantum states of each of the qubits into ancilla qubits. In other words, the quantum processor updates the quantum states of ancilla qubits so that each ancilla qubit is set to or otherwise placed in an aggregate quantum state based on a combination of the quantum states of the individual qubits in the respective group of associated qubits. Some ancilla qubits are shown in FIG. 5 as ancilla qubits 512, which are labeled AA-AD (where AA identifies ancilla qubit A, AB identifies ancilla qubit B, etc.). For the example in FIG. 5, it is assumed that four instances of the quantum program have been run substantially in parallel using sets of qubits 504-510 and thus the quantum state of qubits A-D in each of the sets of qubits 504-510 have been set via the sequence of quantum gate operations of the quantum program. When combining the quantum states of the groups of associated qubits, the quantum processor combines the quantum states of the group of associated A qubits into the quantum state of ancilla qubit AA. The quantum states of each of the A qubits in each of sets of qubits 504-510 are therefore aggregated into the quantum state of the ancilla qubit AA. Following this operation, the quantum state of the ancilla qubit is set to a quantum state that is a representation of, reflects a relationship between, and/or otherwise directly or indirectly identifies quantum states of the qubits in the group of associated qubits. For example, the quantum state of ancilla qubit AA can be set to the average of the quantum states of the qubits in the group of associated A qubits, the sum of the quantum states, the product of the quantum states, etc. The quantum processor also combines the quantum states of the each of groups of associated B-D qubits into the quantum state of ancilla qubit AB-AD, respectively.

The quantum processor combines the quantum states for associated groups in the ancilla qubits as described to simplify the measurement of the quantum state of the qubits (and possibly for other reasons). That is, the quantum processor, instead of measuring the quantum state of the individual qubits in the groups of associated qubits, can measure the aggregated quantum state of the ancilla qubits. Continuing the example, the quantum processor measures the quantum state of ancilla qubit AA instead of measuring the quantum state of each of the qubits in the associated group of A qubits, measures the quantum state of ancilla qubit AB instead of measuring the quantum state of each of the qubits in the associated group of B qubits, etc. By measuring the quantum state of the ancilla qubits instead of the individual qubits, the quantum processor can significantly reduce the number of measurements needed for providing the outputs of the instances of the quantum program. Note that, although some information can be lost by combining the quantum state of the qubits into the ancilla qubits in some implementations, for VQAs, the combined values of the qubits are used for determining results of the VQAs. This means that combining the quantum states of the qubits in the groups of associated qubits into the ancilla qubits should not make a significant difference in the eventual result of the VQA, given the number of instances of the quantum program that are run.

Figure 6:
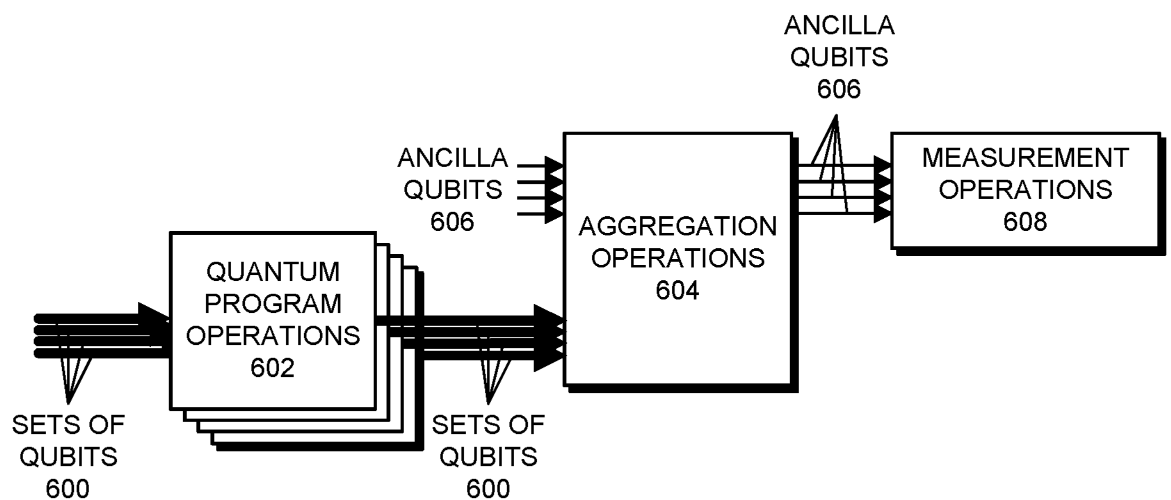
FIG. 6 presents a block diagram illustrating operations for combining quantum states of qubits in groups of associated qubits in accordance with some implementations.
Figure 7:
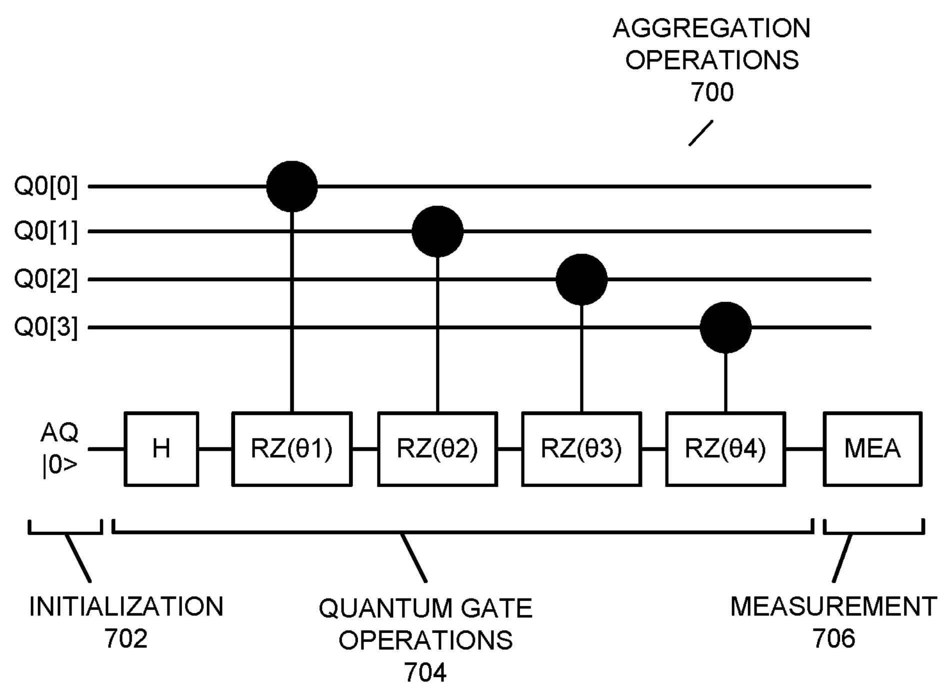
FIG. 7 presents a block diagram illustrating operations for combining quantum states of a group of associated qubits in accordance with some implementations.

FIG. 6 presents a block diagram illustrating operations for combining quantum states of qubits in groups of associated qubits in accordance with some implementations. As can be seen in FIG. 6, a quantum processor performs quantum program operations 602 (e.g., of quantum program 300) on multiple sets of qubits 600 (e.g., sets of qubits 504-510)—with each set of qubits being represented by a heavier black arrow. In other words, the quantum processor performs quantum program operations 602 included in the quantum program on each set of qubits 600, so that the quantum states of the individual qubits in the sets of qubits 600 are set accordingly. Following quantum program operations 602, the quantum processor performs aggregation operations using the sets of qubits 600. For the aggregation operations, the quantum processor sets quantum states for ancilla qubits 606 (e.g., ancilla qubits 512) based on quantum states of respective groups of associated qubits from the separate sets of qubits 600. Generally, for this operation, the quantum processor performs one or more quantum gate operations using the quantum state of each of the qubits in each group of associated qubits to set a quantum state of a respective ancilla qubit. An example of aggregation operations for setting the quantum states for the ancilla qubits is shown in FIG. 7. The quantum processor then performs measurement operations 608 to measure the quantum states of the ancilla qubits 606. The quantum processor can return the measured quantum states of the ancilla qubits to a processor (e.g., processor 102) to be used for generating the overall result of the quantum program, as described elsewhere herein.

Although a particular number of ancilla qubits 512 are shown in FIG. 5, in some implementations, a different number of ancilla qubits are used. For example, in some implementations, only specified qubits from the sets of qubits may be combined (e.g., only the A qubits, only the A and B qubits, etc.)—and thus some qubits are individually measured. In other words, the quantum states of less than all of the possible groups of associated qubits may be combined into ancilla qubits when sufficient ancilla qubits are not available to enable combining all of the possible groups of associated qubits, when some of the available ancilla qubits are lower reliability qubits or otherwise cannot have the quantum states of qubits combined therein, etc. As another example, in some implementations, the quantum states in the qubits for fewer than all of the instances of the quantum program that are run substantially in parallel on the quantum processor are combined. In other words, in each batch of instances of the quantum program that are run substantially in parallel on the quantum processor, the quantum states of groups of associated qubits for only a subset of the instances may be combined. Generally, in the described implementations, any mixture of combining quantum states for qubits in associated groups of qubits and measuring individual qubits may be used.

Although ancilla qubits 512 are shown in FIG. 5 as being separate from the respective associated group of qubits, in some implementations, one (or more) of the qubits in the sets of qubits themselves are used as ancilla qubits. In these implementations, the quantum state of a given qubit in a set of qubits can be updated based on the quantum states of the other qubits in the set of qubits so that the given qubit ends up in an aggregated quantum state based on the quantum states of all of the qubits in the set of qubits. For example, the A qubit in set of qubits 504 may function as the ancilla qubit and therefore have its quantum state updated based on the quantum states of the A qubits in the other sets of qubits, i.e., in sets of qubits 506-510. After this operation is completed, in these implementations, the A qubit in set of qubits 504 is set to the aggregated quantum state of all of the A qubits from sets of qubits 504-510—and can be measured as described herein.

Aggregation Operations

In the described implementations, a quantum processor combines the quantum states of groups of associated qubits into respective ancilla qubits. FIG. 7 presents a block diagram illustrating aggregation operations 700 for combining quantum states of a group of associated qubits in accordance with some implementations. For the example in FIG. 7, the group of associated qubits is shown as qubits Q0[0]-Q3[0], which are the zeroth qubit from each of four different sets of qubits (e.g., the A qubits in sets of qubits 504-510), and the ancilla qubit is shown as qubit AQ (e.g., the AA qubit in ancilla qubits 512). Aggregation operations 700 can be considered to have three parts, with the first part being initialization 702 for the ancilla qubit AQ, the second part being quantum gate operations 704 on the ancilla qubit AQ, and the third part being measurement 706 of the quantum state of the ancilla qubit AQ. For initialization 702, the ancilla qubit AQ is placed in a desired quantum state, as shown via the well known |0> notation in FIG. 7. For quantum gate operations 704, a number of quantum gate operations are performed on/applied to the ancilla qubit AQ. A Hadamard quantum gate (H) is applied to the ancilla qubit AQ to map the ancilla qubit AQ's basis state |0> to two superposition states with equal weight of the basis states |0> and |1>(i.e., to create an evenly distributed quantum state for the ancilla qubit AQ). A first controlled Z-rotation quantum gate is applied to the ancilla qubit AQ (i.e., a target qubit) based on the quantum state of the Q0[0] qubit (i.e., a control qubit). This results in a specified rotation (i.e., by angle $\theta_1$) of the phase state of the ancilla qubit AQ about the Z-axis when the Q0[0] qubit's quantum state has a specified value (e.g., |1>, etc.) or is within a given range of values—but no rotation (or a different rotation) when the Q0[0] qubit's quantum state has a different value or is outside of the given range of values. Second through fourth controlled Z-rotation quantum gates are then applied to the ancilla qubit AQ, which similarly cause specified rotations (i.e., by angle $\theta_2$, $\theta_3$, or $\theta_4$) of the phase state of the ancilla qubit AQ when each of the Q0[1]-Q0[3] qubit's quantum state, respectively, has the specified value or is within the given range of values—or no rotation (or a different rotation) when the respective qubits has a different value or is outside the given range of values. In some cases, some or all of $\theta_1$, $\theta_2$, $\theta_3$, and $\theta_4$ are not equal, and thus may be different angles. At the conclusion of quantum gate operations 704, the quantum states of the group of associated qubits have been combined into the ancilla qubit AQ—and thus the quantum state of the ancilla qubit AQ is set based on the quantum states of the four Q0[0]-Q0[3] qubits. That is, the phase state of ancilla qubit AQ is set based on the rotations performed (or not performed) during quantum gate operations 704. For measurement 706, measurement elements (MEA) in the quantum processor measure the quantum state of the ancilla qubit AQ. The measurement elements return one or more values, such as bit values representative of the quantum state of the ancilla qubit AQ. For example, in some implementations, the measurement elements return a bit string or vector that represents the quantum state of the ancilla qubit AQ.

In some implementations, the quantum processor uses weighting to control the magnitude of updates to the quantum states of ancilla qubits based on properties of qubits in respective groups of associated qubits. In these implementations, the particular updates to the quantum states of ancilla qubits need not be equal in scale for all qubits in groups of associated qubits. Instead, the updates to the quantum states of the ancilla qubits that are made based on specified qubits are larger in magnitude—and therefore may have more effect on the quantum states of the ancilla qubits—than the updates that are made based on other qubits. For example, in some implementations, the properties for the qubits include properties such as a quantum gate fidelity for that qubit; a measurement error rate for that qubit; and a number of connections for that qubit. In some of these implementations, updates to the quantum states of ancilla qubits made based on the quantum states of lower quality qubits (i.e., qubits with lower quantum gate fidelity, higher measurement errors, etc.) can be limited to avoid the quantum states of the lower quality qubits possibly degrading the combined quantum states of the ancilla qubits. For instance, continuing the example, in FIG. 7, the weighting may be implemented by not performing rotations for lower-quality qubits, using a first controlled rotation gate for lower quality qubits and a second controlled rotation gate for higher quality qubits, etc. In some of these implementations, the quantum processor, processor, and/or another entity keeps quality metrics for qubits or groups thereof, such as metrics indicative of coherence time for the qubits, gate errors or fidelity, measurement errors, a number of connections between qubits, etc. The quantum processor then uses these quality metrics for controlling the magnitude of updates to the quantum states of ancilla qubits as described above.

Although a number of quantum gate operations are presented as an example in FIG. 7, in some implementations, different quantum gate operations are performed. For example, in some implementations, instead of a single quantum gate operation (i.e., the controlled rotation), two or more quantum gate operations are performed for each qubit. In some of these implementations, the quantum gate operations use or rely on one or more third-party quantum gates during or for some or all of the quantum gate operations. Generally, any controlled quantum gate operations can be performed that use the quantum states of one or more of the qubits in a group of associated qubits to control an operation for setting the quantum state of an ancilla qubit in such a way that quantum states of qubits in the group of associated qubits can be determined (i.e., the quantum states of the qubits in the group of associated qubits individually, as subgroups, and/or as a group can be determined). For example, any sequence of quantum gate operations can be performed that result in the quantum state of an ancilla qubit being set to an average of the quantum states of the qubits in a given group of associated qubits, a sum of the quantum states, a product of the quantum states, etc.

Figure 8:
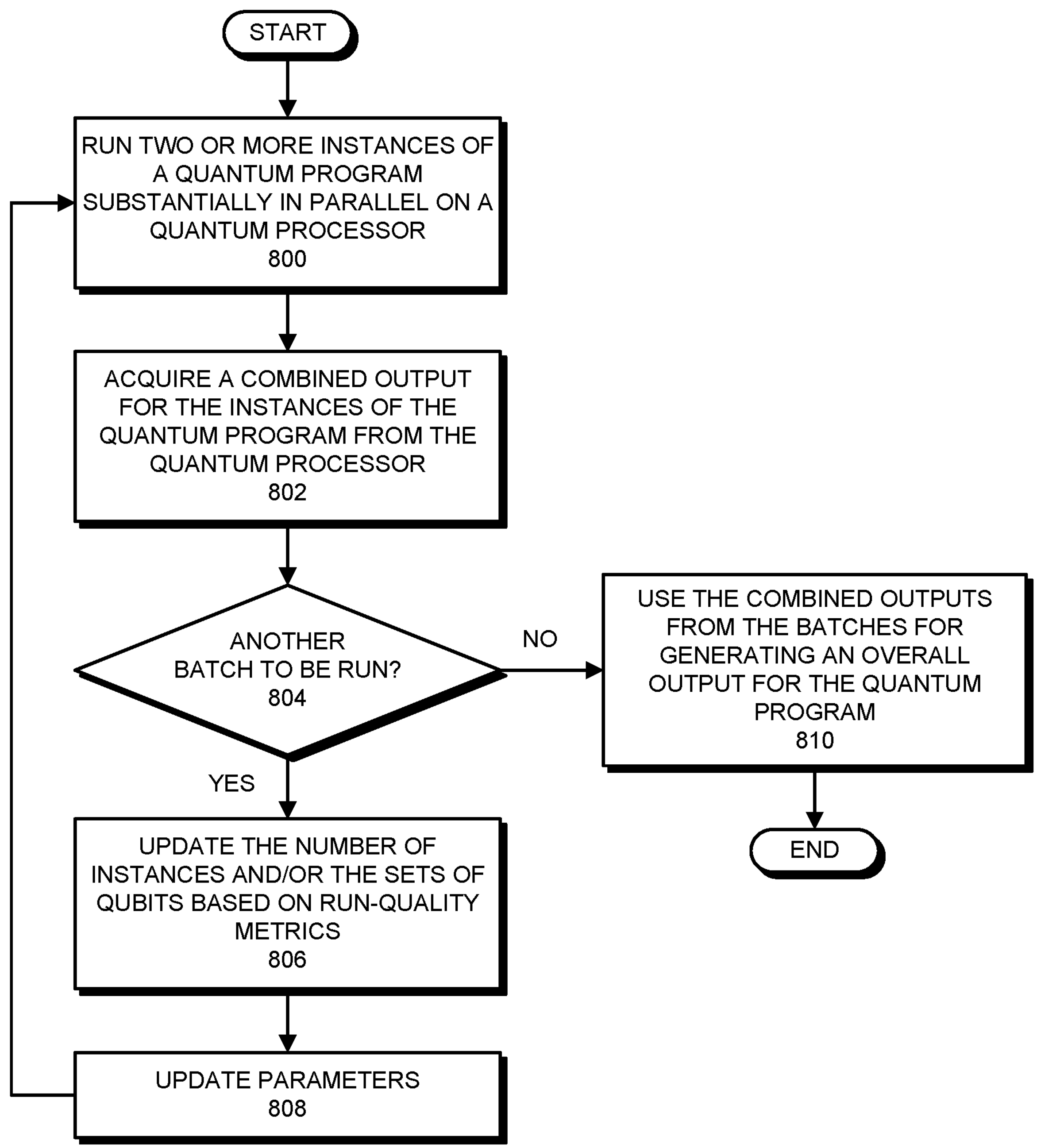
FIG. 8 presents a flowchart illustrating a process for running multiple instances of a quantum program substantially in parallel on a quantum processor in accordance with some implementations.

Process for Running Instances of a Quantum Program Substantially in Parallel on a Quantum Processor In the described implementations, a processor (e.g., processor 102) runs multiple instances of a quantum program (e.g., quantum program 300) substantially in parallel on a quantum processor (e.g., quantum processor 104). FIG. 8 presents a flowchart illustrating a process for running multiple instances of a quantum program substantially in parallel on a quantum processor in accordance with some implementations. FIG. 8 is presented as a general example of operations performed in some implementations. In other implementations, however, different operations are performed and/or operations are performed in a different order. Additionally, although certain elements are used in describing the process (e.g., a processor, etc.), in some implementations, other elements perform the operations.

In describing the operations of FIG. 8, it is assumed that a quantum processor includes an adequate number and arrangement of qubits to enable running two or more instances of the quantum program substantially in parallel. In addition, it is assumed that sets of qubits (e.g., sets of qubits 504-510) have been selected as described above. It is further assumed that the two or more instances of the quantum program are run substantially in parallel on the quantum processor are called, as a group, a "batch." Multiple batches of the quantum program are run to generate outputs for the quantum program and the outputs from all of the batches are used for generating an overall output for the quantum program. For example, if the quantum program is a VQA for which 80 instances are to be run for generating outputs and a batch includes four instances of the VQA, 20 batches will be run. It is further assumed that the outputs of instances of the quantum program are combined by the quantum processor before being measured and provided to a processor to be used for generating the overall output of the quantum program. That is, the quantum states of groups of associated qubits that were used for running two or more instances of the quantum program are combined by the quantum processor using ancilla qubits. The quantum states of the ancilla qubits are then measured by the quantum processor to acquire the combined outputs of the two or more instances of the quantum program and the combined outputs are provided to the processor.

The process in FIG. 8 starts when the processor runs two or more instances of a quantum program substantially in parallel on the quantum processor using a separate set of qubits from among multiple qubits in the quantum processor (step 800). For this operation, the processor communicates a request to the quantum processor to run the two or more instances of the quantum program substantially in parallel on the quantum processor. For example, in some implementations, the processor sends a single request to the quantum processor that identifies (or possibly includes) the quantum program and the sets of qubits upon which each instance of the quantum program is to be run (e.g., by qubit numerical identifiers, position identifiers, etc.). As another, in some implementations, the processor sends a request associated with each instance of the quantum program to the quantum processor that identifies (or possibly includes) the quantum program and a particular set of qubits upon which that instance of the quantum program is to be run. In some implementations, the quantum program is parameterized (e.g., as with a VQA, etc.) and running the two or more instances of the quantum program includes the processor identifying values for the parameters to the quantum processor. For example, assuming quantum program 300 is the quantum program, identifying the values for the parameters includes identifying values for $\beta$ and/or $\gamma$.

Figure 9:
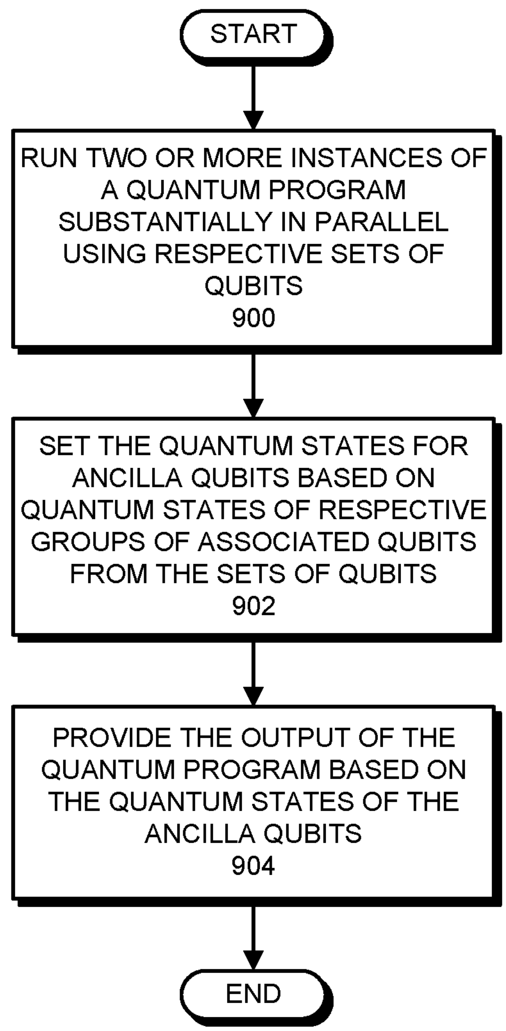
FIG. 9 presents a block diagram illustrating operations performed by the quantum processor when running the two or more instances of the quantum program substantially in parallel in accordance with some implementations.

FIG. 9 presents a block diagram illustrating operations performed by the quantum processor when running the two or more instances of the quantum program substantially in parallel in accordance with some implementations. FIG. 9 is presented as a general example of operations performed in some implementations. In other implementations, however, different operations are performed and/or operations are performed in a different order. Additionally, although certain elements are used in describing the process (e.g., a quantum processor, etc.), in some implementations, other elements perform the operations.

The operations of FIG. 9 start with the quantum processor running two or more instances of the quantum program substantially in parallel using respective sets of qubits (e.g., sets of qubits 504-510) (step 900). For this operation, the quantum processor establishes an initial quantum state for each of the qubits in the respective sets of qubits (e.g., initialization 302). The quantum processor then performs quantum gate operations of the quantum program using each respective set of qubits, thereby setting the quantum state of each of the qubits in the respective sets of qubits in accordance with the quantum program (e.g., quantum gate operations 304).

The quantum processor next sets the quantum states for ancilla qubits (e.g., ancilla qubits 512) based on quantum states of respective groups of associated qubits from the separate sets of qubits (e.g., the A qubits from each of sets of qubits 504-510, etc.) (step 902). For this operation, the quantum processor combines the quantum states of groups of associated qubits from the respective sets of qubits using ancilla qubits. More specifically, the quantum processor, for each qubit (or groups of qubits) in a respective group of associated qubits, performs at least one quantum gate operation to update a quantum state of the ancilla qubit based on the quantum state of that qubit (or those qubits). For example, in some implementations, the quantum processor performs quantum gate operations similar to those shown in quantum gate operations 704. The quantum processor may also use weighting to control an amount by which each qubit's quantum state effects the quantum state of an ancilla qubit, as described in more detail above. When this operation is complete, the quantum state of each of the ancilla qubits is set to a quantum state that is a representation of, reflects a relationship between, and/or otherwise directly or indirectly identifies quantum states of the qubits in a respective group of associated qubits. For example, the quantum state of each ancilla qubit can be set to a quantum state that is representative of the average of the quantum states of the qubits in the respective group of associated qubits, the sum of the quantum states, the product of the quantum states, etc.

After combining the quantum states of the groups of associated qubits into the ancilla qubits, the quantum processor measures, or "samples," the quantum state of each of the ancilla qubits to determine an output for each of the two or more instances of the quantum program. The quantum processor then provides an output of the quantum program based on the quantum states of the ancilla qubits (step 904). In other words, the quantum processor provides the outputs for the two or more instances of the quantum program as measured from the ancilla qubits—which, again, are set to a quantum state that represents, reflects, or otherwise identifies the quantum states of the qubits in the respective group of associated qubits. The quantum processor is able to measure the quantum states of the ancilla qubits instead of individually measuring the quantum state of each of the qubits in the groups of associated qubits—thereby avoiding some of the quantum processor measurement operations (and the associated delay and potential for errors).

Returning to FIG. 8, the processor next acquires a combined output for the instances of the quantum program from the quantum processor (step 802). For this operation, the processor requests and receives, reads, or is otherwise provided with values of the outputs (e.g., a bitstring, a vector, and/or other data) for the two or more instances of the quantum program. For example, in some implementations, the quantum processor communicates, to the processor, a signal indicating that the outputs of the two or more instances of the quantum program have completed running and the ancilla qubits have been measured to determine the outputs of the two or more instances. The processor then reads memory locations, registers, etc. that are used for storing the values of the outputs in the quantum processor. After this operation is complete, the processor has the values of the outputs for the two or more instances of the quantum program that ran on the quantum processor.

In some implementations, the processor processes the outputs to determine outputs that appear to be of lower quality or incorrect (e.g., that deviate by more than a threshold from other outputs, etc.). In these implementations, the lower quality or incorrect outputs can be discarded—and therefore not used for subsequent steps in FIG. 8.

The processor then determines whether another batch of two or more instances of the quantum program is to be run (step 804). In other words, the processor determines whether (or not) more instance(s) of the quantum program are to be run in a subsequent batch to generate outputs to be used in generating the overall output for the quantum program. If so, the processor updates the number of instances and/or the sets of qubits based on run-quality metrics (step 806). For example, in some implementations, the processor can keep track of or otherwise acquire information (e.g., from the quantum processor) about the accuracy and precision, or "quality," of individual qubits and/or groups thereof and determine whether previously selected sets of qubits are providing satisfactory outputs for instances of the quantum program. If not, the processor can reselect sets of qubits (e.g., shuffle sets of qubits so that aggregate quality metrics for qubits are more balanced between the sets of qubits, etc.). As another example, the processor can monitor outputs from one or more batches and determine, based on trends in results between batches, consistency of results within a batch or between two or more batches, etc., that a different number of instances of the quantum program should be included in a subsequent batch. Note that, where the run-quality metrics prove to be acceptable (i.e., have not fallen below a threshold), the processor may leave the number of instances and/or the sets of qubits unchanged.

The processor then updates the parameters for the quantum program (step 808). For this operation, the processor uses the outputs of the instances of the quantum program for one or more batches to determine whether parameters of the quantum program are to be updated for a subsequent (and possibly multiple subsequent) runs of instances of the quantum program. For example, assuming quantum program 300 is the quantum program, this includes determining updated values for $\beta$ and/or $\gamma$. The processor then returns to step 800 to run a next two or more instances of a quantum program substantially in parallel the quantum processor using respective separate sets of qubits. Note that, where the parameters prove to be acceptable, the processor may leave the parameters unchanged.

Returning to step 804, when another batch is not to be run (step 804), the processor uses the combined outputs for each batch for generating an overall output for the quantum program (step 810). For this operation, the processor, which has acquired combined outputs from all batches in which two or more instances of the quantum program were run substantially in parallel on the quantum processor (and possibly from running one or more individual instances of the quantum program on the quantum processor by themselves), processes the outputs to generate the overall output for the quantum program. For example, the processor can perform one or more mathematical, statistical, logical, and/or other operations on the outputs to generate the overall output. Following this operation, the process in FIG. 8 is complete.

In some implementations, at least one electronic device (e.g., electronic device 100, etc.) uses code and/or data stored on a non-transitory computer-readable storage medium to perform some or all of the operations described herein. More specifically, the at least one electronic device reads code and/or data from the computer-readable storage medium and executes the code and/or uses the data when performing the described operations. A computer-readable storage medium can be any device, medium, or combination thereof that stores code and/or data for use by an electronic device. For example, the computer-readable storage medium can include, but is not limited to, volatile and/or non-volatile memory, including flash memory, random access memory (e.g., eDRAM, RAM, SRAM, DRAM, DDR5 DRAM, etc.), non-volatile RAM (e.g., phase change memory, ferroelectric random access memory, spin-transfer torque random access memory, magnetoresistive random access memory, etc.), read-only memory (ROM), and/or magnetic or optical storage mediums (e.g., disk drives, magnetic tape, CDs, DVDs, etc.).

In some implementations, one or more hardware modules perform the operations described herein. For example, the hardware modules can include, but are not limited to, one or more central processing units (CPUs)/CPU cores, graphics processing units (GPUs)/GPU cores, application-specific integrated circuit (ASIC) chips, field-programmable gate arrays (FPGAs), quantum processors, compressors or encoders, encryption functional blocks, compute units, embedded processors, accelerated processing units (APUs), controllers, requesters, completers, network communication links, and/or other functional blocks. When circuitry (e.g., integrated circuit elements, discrete circuit elements, etc.) in such hardware modules is activated, the circuitry performs some or all of the operations. In some implementations, the hardware modules include purpose-specific or dedicated circuitry that performs the operations "in hardware" and without executing instructions. In some implementations, the hardware modules include general purpose circuitry such as execution pipelines, compute or processing units, etc. that, upon executing instructions (e.g., program code, firmware, etc.), performs the operations.

In some implementations, a data structure representative of some or all of the functional blocks and circuit elements described herein (e.g., electronic device 100, or some portion thereof) is stored on a non-transitory computer-readable storage medium that includes a database or other data structure which can be read by an electronic device and used, directly or indirectly, to fabricate hardware including the functional blocks and circuit elements. For example, the data structure may be a behavioral-level description or register-transfer level (RTL) description of the hardware functionality in a high-level design language (HDL) such as Verilog or VHDL. The description may be read by a synthesis tool which may synthesize the description to produce a netlist including a list of transistors/circuit elements from a synthesis library that represent the functionality of the hardware including the above-described functional blocks and circuit elements. The netlist may then be placed and routed to produce a data set describing geometric shapes to be applied to masks. The masks may then be used in various semiconductor fabrication steps to produce a semiconductor circuit or circuits (e.g., integrated circuits) corresponding to the above-described functional blocks and circuit elements. Alternatively, the database on the computer accessible storage medium may be the netlist (with or without the synthesis library) or the data set, as desired, or Graphic Data System (GDS) II data.

In this description, variables or unspecified values (i.e., general descriptions of values without particular instances of the values) are represented by letters such as N and M. As used herein, despite possibly using similar letters in different locations in this description, the variables and unspecified values in each case are not necessarily the same, i.e., there may be different variable amounts and values intended for some or all of the general variables and unspecified values. In other words, particular instances of N and any other letters used to represent variables and unspecified values in this description are not necessarily related to one another.

The expression "et cetera" or "etc." as used herein is intended to present an and/or case, i.e., the equivalent of "at least one of" the elements in a list with which the etc. is associated. For example, in the statement "the electronic device performs a first operation, a second operation, etc.," the electronic device performs at least one of the first operation, the second operation, and other operations. In addition, the elements in a list associated with an etc. are merely examples from among a set of examples—and at least some of the examples may not appear in some implementations.

The foregoing descriptions of implementations have been presented only for purposes of illustration and description. They are not intended to be exhaustive or to limit the implementations to the forms disclosed. Accordingly, many modifications and variations will be apparent to practitioners skilled in the art. Additionally, the above disclosure is not intended to limit the implementations. The scope of the implementations is defined by the appended claims.

What is claimed is:

1. An electronic device, comprising:

a quantum processor including a plurality of qubits, the quantum processor configured to:

run a plurality of instances of a quantum program substantially in parallel, each of the plurality of instances of the quantum program being run using a separate set of qubits from among the plurality of qubits;

set quantum states for ancilla qubits, each of the ancilla qubits having a quantum state set based on quantum states of a respective group of associated qubits, wherein each respective group of associated qubits includes qubits that performed a same operation when running the plurality of instances of the quantum program; and provide an output of the plurality of instances of the quantum program based on the quantum states of the ancilla qubits.

2. The electronic device of claim 1, wherein, when setting a quantum state for a given ancilla qubit based on quantum states of the respective group of associated qubits, the quantum processor is configured to:

for each qubit in the respective group of associated qubits:

perform at least one quantum gate operation to update a quantum state of the given ancilla qubit based on the quantum state of the qubit.

3. The electronic device of claim 2, wherein the at least one quantum gate operation includes a quantum gate operation for a controlled quantum gate, the controlled quantum gate being controlled based at least in part on the quantum state of the qubit.

4. The electronic device of claim 2, wherein, when updating the quantum state of the given ancilla qubit based on the quantum state of the qubit, the quantum processor is configured to:

use weighting to control the updating the quantum state of the given ancilla qubit based on properties of the qubit.

5. The electronic device of claim 4, wherein the properties of the qubit include:

a quantum gate fidelity for the qubit;

a measurement error rate for the qubit; and a number of connections for the qubit.

6. The electronic device of claim 2, wherein the quantum processor is further configured to:

before performing the at least one quantum gate operation to update the quantum state of the given ancilla qubit, set the given ancilla qubit into a specified quantum state.

7. The electronic device of claim 1, wherein each group of associated qubits includes a same qubit from each separate set of qubits that was used to run a respective one of the plurality of instances of the quantum program, the same qubit being a specified qubit for the quantum program.

8. The electronic device of claim 1, wherein the quantum processor is further configured to:

run the quantum program a specified number of times to generate a set of individual outputs; and generate an overall output for the quantum program by combining the set of individual outputs.

9. The electronic device of claim 1, further comprising:

a processor configured to:

acquire the output provided by the quantum processor; and generate an overall output of the quantum program based at least in part on the output.

10. The electronic device of claim 9, wherein the processor is configured to generate the overall output of the quantum program based on the output in combination with outputs of other instances of the quantum program run on the quantum processor at one or more different times than the plurality of instances of the quantum program.

11. The electronic device of claim 1, wherein the quantum processor is configured to provide the output of the plurality of instances of the quantum program based on the quantum states of the ancilla qubits by:

measuring the quantum states of the ancilla qubits to acquire measured values; and providing the measured values as the output of the plurality of instances of the quantum program.

12. A method for running a quantum program on a quantum processor that includes a plurality of qubits in an electronic device, the method comprising:

running a plurality of instances of a quantum program, each of the plurality of instances of the quantum program being run using a separate set of qubits from the plurality of qubits;

setting quantum states for ancilla qubits, each of the ancilla qubits having a quantum state set based on quantum states of a respective group of associated qubits, and each respective group of associated qubits including qubits that performed a same operation when running the plurality of instances of the quantum program; and providing an output of the plurality of instances of the quantum program based on the quantum states of the ancilla qubits.

13. The method of claim 12, wherein setting a quantum state for a given ancilla qubit based on quantum states of the respective group of associated qubits includes:

for each qubit in the respective group of associated qubits:

performing at least one quantum gate operation to update a quantum state of the given ancilla qubit based on the quantum state of the qubit.

14. The method of claim 13, wherein the at least one quantum gate operation includes a quantum gate operation for a controlled quantum gate, the controlled quantum gate being controlled based at least in part on the quantum state of the qubit.

15. The method of claim 13, wherein updating the quantum state of the given ancilla qubit based on the quantum state of the qubit includes:

using weighting to control updating the quantum state of the given ancilla qubit based on properties of the qubit.

16. The method of claim 15, wherein the properties of the qubit include:

a quantum gate fidelity for the qubit;

a measurement error rate for the qubit; and a number of connections for the qubit.

17. The method of claim 12, wherein each group of associated qubits includes a same qubit from each separate set of qubits that was used to run a respective one of the plurality of instances of the quantum program, the same qubit being a specified qubit for the quantum program.

18. The method of claim 12, wherein the electronic device includes a processor, the method further comprising:

acquiring, by the processor, the output provided by the quantum processor; and generating, by the processor, an overall output of the quantum program based at least in part on the output.

19. The method of claim 18, wherein generating the overall output of the quantum program based at least in part on the output includes:

generating the overall output of the quantum program based on the output in combination with outputs of other instances of the quantum program run on the quantum processor at one or more different times than the plurality of instances of the quantum program.

20. The method of claim 12, wherein providing the output of the plurality of instances of the quantum program based on the quantum states of the ancilla qubits includes:

measuring the quantum states of the ancilla qubits to acquire measured values; and providing the measured values as the output of the instances of the quantum program.

* * * * *